Nov. 19, 1940.    C. T. ASHBY ET AL    2,221,750

DRAFT CONTROL

Filed Oct. 5, 1937

INVENTORS
Carl T. Ashby
Ralph B. Hayne
BY
Ed Fernander their ATTORNEY.

Patented Nov. 19, 1940

2,221,750

UNITED STATES PATENT OFFICE 2,221,750

DRAFT CONTROL

Carl T. Ashby and Ralph B. Hayne, Evansville, Ind., assignors to Servel, Inc., New York, N. Y., a corporation of Delaware Application October 5, 1937, Serial No. 167,350

8 Claims. (Cl. 236—1)

Figure 1:
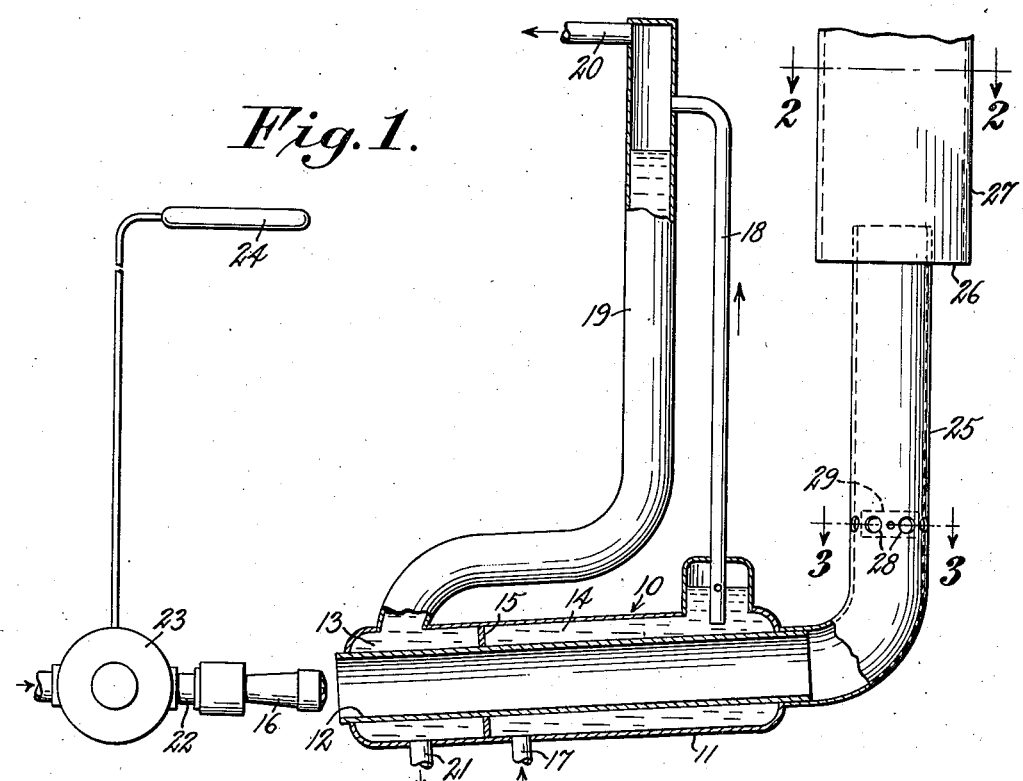
Figure 2:
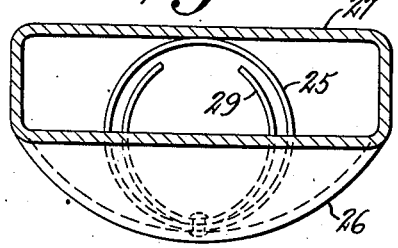
Figure 4:
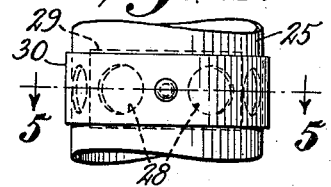
Figure 3:
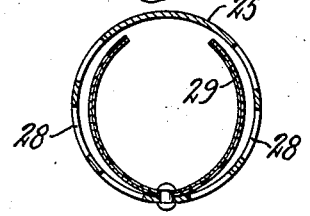
Figure 5:
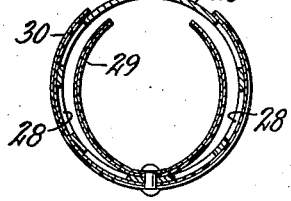

This invention relates to draft control and has for its object to provide an improved draft control for automatically regulating the draft on a burner or the like, as will appear from the following description and accompanying drawing in which:

Fig. 1 is a view diagrammatically illustrating the invention applied to a generator of an absorption refrigeration system;

Figs. 2 and 3 are sectional views taken on lines 2—2 and 3—3, respectively, of Fig. 1;

Fig. 4 is a fragmentary view illustrating a modification of the invention shown in Figs. 1 to 3 inclusive; and Fig. 5 is a sectional view taken on line 5—5 of Fig. 4.

Referring to Fig. 1, the invention is applied to a generator 10 of an absorption refrigeration system of a uniform pressure type and like that described in Patent No. 2,037,782 to William R. Hainsworth. The generator 10 includes a jacket 11 having a heating flue 12 extending therethrough. The jacket 11 is divided into two chambers 13 and 14 by a partition 15. The chambers 13 and 14 contain absorption liquid adapted to be heated by a burner 16 which projects its flame into the lower end of the heating flue 12. Absorption liquid enriched in refrigerant enters chamber 14 through conduit 17 and, due to heating, is raised by vapor-lift action through conduit 18 into a stand-pipe 19. Refrigerant vapor entering stand-pipe 19 from conduit 18, and also the vapor expelled from solution in chamber 13, flows from stand-pipe 19 through conduit 20. Absorption liquid weak in refrigerant flows from chamber 13 through conduit 21.

Combustible gas is delivered to burner 16 through conduit 22 from a suitable source of supply. A control device 23 is provided in conduit 22 to control the flow of gas to burner 16. The control device 23 is preferably thermostatically operated by a thermostat including a bulb 24 which may be arranged in thermal exchange relation with the cooling unit of the refrigeration system.

The flue 12 is provided with an offtake or short vertical extension 25 which projects into the lower enlarged end 26 of a riser flue 27. The riser flue 27 permits air to mix with the flue gases to cool and to dilute the flue gases flowing from the generator 10.

The flue extension 25 is provided with a plurality of openings 28. Within the flue extension 25 adjacent the openings 28 is secured a ring-shaped bi-metallic strip 29. When the flue gases are at or above a predetermined temperature, the bi-metallic strip 29 expands sufficiently to cover and close the openings 28; and conversely, when the flue gases fall below the predetermined temperature, the strip 29 moves away from the openings 28, whereby air is permitted to enter the flue through the openings.

When the burner 16 is operating with a maximum flame, that is, with a flame of maximum size, the flue gases are at or above the predetermined temperature and the openings 28 are closed by the strip 29. When the size of the burner flame is reduced by the control device 23, either manually or by the thermostat associated therewith, the temperature of the flue gases is reduced. By providing the openings 28 and bi-metallic strip 29, air is permitted to enter the flue when the flue gases fall below the predetermined temperature and the burner is operating with a flame which is smaller than the maximum flame. Since the draft on burner 16 is reduced under these conditions and less air is drawn in to the lower end of flue 12, the heating of absorption liquid in chambers 13 and 14 by flue 12 is improved. The heating effected by flue 12 may be referred to as the flue efficiency, and, by improving the flue efficiency, a saving in operating cost is realized because the heat input is more effectively utilized to heat absorption liquid. With air entering through the openings 28, therefore, the burner 16 operates with less draft, thereby improving the flue efficiency when the size of the burner flame is less than maximum.

In order to obtain a full draft when operation of the burner 16 is first started, it is desirable to close the openings in the flue. Such a modification is shown in Figs. 4 and 5 which is similar to the embodiment just described and further includes a ring-shaped bi-metallic strip 30 which is secured to the outside of the flue adjacent the openings 28. When the flue extension 25 is relatively cool and below the temperature range encountered during normal operation of the burner 16, the bi-metallic strip 30 contracts and closes the openings 28. Thus, when the operation of the burner is started and whenever the flue is relatively cool, the burner operates with full draft. When the flue reaches a temperature below the lowest temperature encountered during normal operation, such as 140° or 150° F., for example, the bi-metallic strip 30 expands to uncover the openings 28. During normal operation of the burner 16, the inner bi-metallic strip 29 operates as described above to increase or decrease the draft on the burner with corresponding changes of temperature of the flue gases.

What is claimed is:

1. A draft regulator for a flue through which heated gases flow from a place of heating, the flue having one or more apertures to admit air therein to mix with flue gases flowing from the place of heating, a first member for closing the aperture or apertures with fall of flue temperature in a low temperature range and for opening the aperture or apertures with rise of flue temperature in the low temperature range, and a second member for opening the aperture or apertures with fall of flue temperature in a higher temperature range and for closing the aperture or apertures with rise of flue temperature in the higher temperature range.

2. A draft regulator for a flue through which heated gases flow from a place of heating, said flue having one or more apertures to admit air therein to mix with flue gases flowing from the place of heating, a first bimetallic member disposed within the flue over the aperture or apertures, a second bimetallic member disposed outside the flue over the aperture or apertures, one of said bimetallic members being operative to move toward the aperture or apertures to close the same with fall of flue temperature in a low temperature range and to move away from the aperture or apertures to open the same with rise of flue temperature in the low temperature range, and the other of said bimetallic members being operative to move away from the aperture or apertures to open the same with fall of flue temperature in a higher temperature range and to move toward the aperture or apertures to close the same with rise of flue temperature in the higher temperature range.

3. A draft regulator for a cylindrical flue through which heated gases flow from a place of heating, the flue having one or more apertures to admit air therein to mix with flue gases flowing from the place of heating, a first curved bimetallic member within the flue adapted to hug the inside thereof and cover the aperture or apertures when expanded, a second curved bimetallic member outside the flue adapted to embrace the outside thereof and cover the aperture or apertures when contracted, one of said bimetallic members being operative to move toward the aperture or apertures to cover the same with fall of flue temperature in a low temperature range and to move away from the aperture or apertures to uncover the same with rise of flue temperature in the low temperature range, and the other of said bimetallic members being operative to move away from the aperture or apertures to uncover the same with fall of flue temperature in a higher temperature range and to move toward the aperture or apertures to cover the same with rise of flue temperature in the higher temperature range.

4. A draft regulator for a cylindrical flue through which heated gases flow from a place of heating, the flue having one or more apertures to admit air therein to mix with flue gases flowing from the place of heating, a curved bimetallic strip secured to said flue adjacent the aperture or apertures and formed to assume the contour of the cylindrical flue when it is influenced by changes in flue temperature to cover the aperture or apertures and hug the wall of the flue, and said curved bimetallic member being operative to move away from the aperture or apertures and uncover the same with fall of flue temperature and to move toward the aperture or apertures to cover the same with rise of flue temperature.

5. A draft regulator as set forth in claim 4 wherein said curved bimetallic member is disposed within the flue in a plane transverse to the direction of the flue.

6. A draft regulator for a flue through which heated gases flow from a place of heating, the flue having a curved wall and one or more apertures in said wall to admit air into the flue for admixture with flue gases flowing from the place of heating, a thermal responsive member mounted on the flue and shaped to conform to the curvature of said wall and overlying the aperture or apertures, and said thermal responsive member being operative to move away from the aperture or apertures to uncover the same with fall of flue temperature and to move toward the aperture or apertures to cover the same with rise of flue temperature.

7. In an absorption type refrigerating system, a generator including a burner, a flue coacting with said burner and having one or more apertures to admit air for admixture with gases flowing through the flue from said burner, thermostatic means responsive to the temperature of the flue gases and so disposed with respect to said aperture or apertures as to always uncover the same when a definite low flue temperature is reached and always cover said aperture or apertures when a definite higher flue temperature is reached, said thermostatic means being formed and arranged so that in all of its positions the gases flow through said flue substantially unimpeded.

8. In an absorption type refrigeration system, a generator including a burner, a flue coacting with said burner and having one or more apertures to admit air for admixture with gases flowing through the flue from said burner, and thermostatic means responsive to the temperature of the flue gases for controlling the admission of air through said aperture or apertures into the flue, said thermostatic means when subjected to a definite low flue temperature operating to always uncover said opening or openings to maximum extent and allow a minimum amount of draft through the flue and when subjected to a definite higher flue temperature operating to always cover said aperture or apertures and allow maximum draft through the flue.

CARL T. ASHBY.
RALPH B. HAYNE.